Patented Oct. 2, 1928.

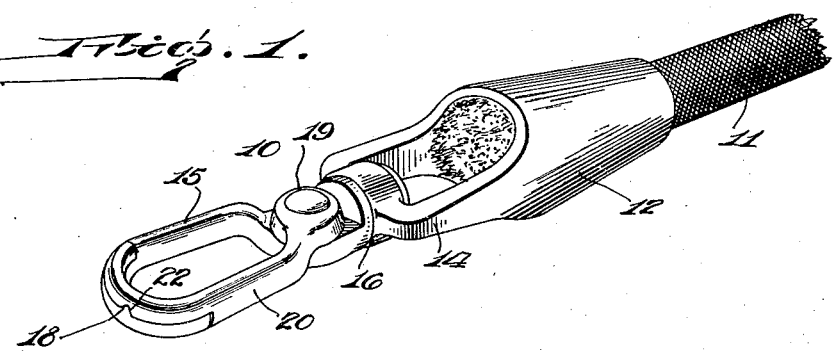
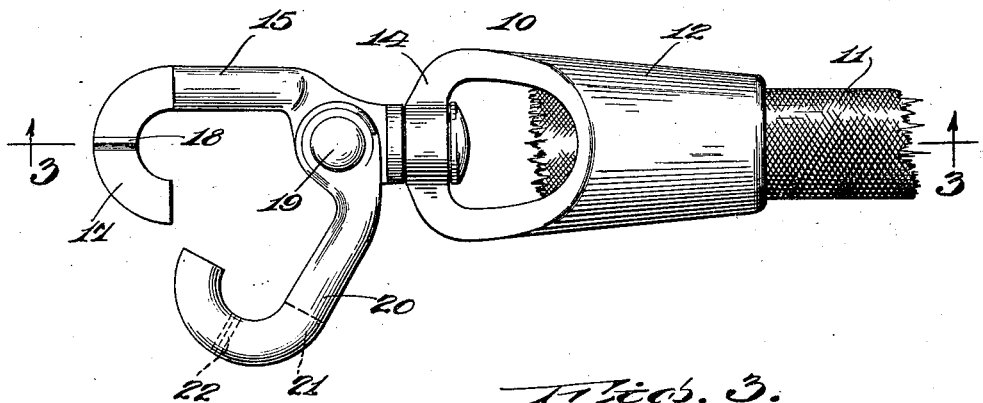
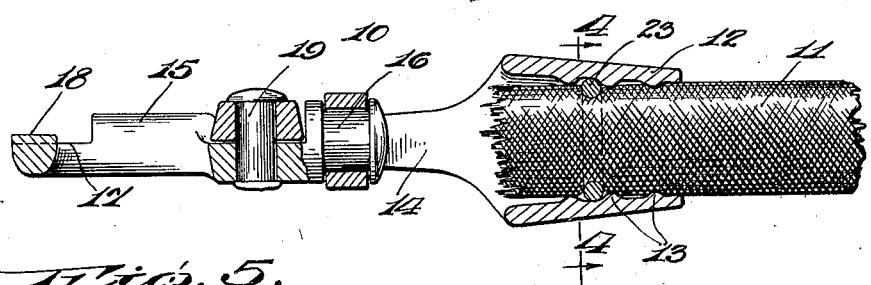
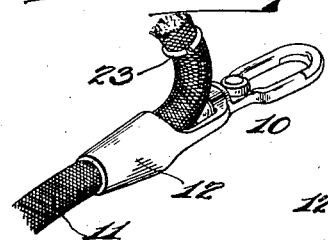
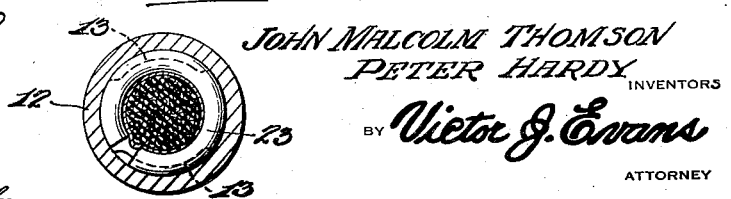

1,686,424

UNITED STATES PATENT OFFICE.

JOHN MALCOLM THOMSON, OF LONG ISLAND CITY, NEW YORK, AND PETER HARDY, OF BRIDGEPORT, CONNECTICUT.

FASTENING DEVICE.

Application filed February 1, 1928. Serial No 251,169.

This invention relates to improvements in fastening devices and has particular reference to such a device for the attachment to the end of an elastic cord by which the same may be detachably connected to an attaching eye.

The primary object of the invention resides in a fastening device for use in connection with the elastic cord of exercising apparatus for preventing the cord from twisting and knotting up which tends to weaken and shorten the life of the same.

Another object is to provide a fastening device which embodies a pair of positive locking jaws adapted to receive the part to which a cord is adapted to be attached and which will positively prevent accidental unfastening of the device during any jerking actions of the cord.

A further object is the provision of a fastening device for elastic cords which includes a sleeve having a tapering bore open throughout its length for wedgingly receiving a split ring fixed to one end of an elastic cord and which serves to securely hold the fastener on the cord.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of our improved fastener in position upon the end of an elastic cord.

Figure 2 is a side elevation of the fastener with the pivoted jaw in an open position.

Figure 3 is a vertical longitudinal sectional view on the line 3—3 of Figure 2.

Figure 4 is a vertical transverse sectional view on the line 4—4 of Figure 3.

Figure 5 is a perspective view showing the manner of attaching the fastening device to one end of an elastic cord.

Referring to the drawing by reference characters, the numeral 10 designates our improved fastening device in its entirety and 11 an elastic cord to which it is attached. Elastic cord of this kind is commonly used in exercising apparatus and great difficulty has been experienced in providing some means for removably connecting the cord to an attaching part which will prevent accidental disconnection of the cord when subjected to the sudden strains to which it is subjected, and for preventing twisting and knotting of the cord. These objections are overcome by the fastening device 10 which will now be fully explained.

The fastening device 10 includes a tapering sleeve 12 open throughout its length and which has its inner walls provided with spaced annular ribs 13. The large end of the sleeve is open at its sides and is bridged by a yoke or bridge 14. A C-shaped stationary jaw 15 is swiveled in the bridge 14 as at 16 and has its free hooked end reduced in thickness as at 17, the upper flat face of which is provided with a V-shaped rib 18 disposed in axial alignment with the swivel connection. Pivoted to the jaw 15 as at 19 is a swingable C-shaped jaw 20 which is disposed on the same plane as the jaw 15 and has its hooked end reduced in thickness as at 21 and adapted to overlie the reduced portion 17 of the jaw 15 when in a closed position. The inner flat face of the reduced end of the jaw 20 is provided with a V-shaped groove or notch 22 adapted to receive the rib 18 and lock the jaws in a closed position at which time they co-act to provide an enclosed eye or loop. The reduced ends of the jaws are substantially resilient to allow the rib to snap into the notch during the swinging of the movable jaw to a closed position, and for permitting the jaws to be sprung to release them when it is desired to move the jaw 20 to an open position.

Carried by the end of the elastic cord to which the fastener is connected is a split resilient ring 23 which is clamped about the cord. The fastening device is attached by passing one end of the cord through the enlarged mouth of the sleeve and pulling the same therethrough as shown in Figure 5 of the drawing. The ring 23 limits the passage of the cord through the sleeve and snaps behind one of the ribs 13. The converging walls of the sleeve tend to compress the split ring to allow it to pass over certain of the ribs whereupon it expands and locks the cord against accidental separation from the fastener.

From the foregoing description, it will be seen that an elastic cord equipped with our improved fastening device may be removably connected to a fixed eye, and when so connected the cord may be turned with respect to the part to which it is connected by reason of the swivel connection 16. This will prevent any possibility of the cord becoming twisted and knotted and will serve to prolong the life of the same. When the jaws are in a closed position, the same are firmly locked against accidental opening, thus assuring a positive connection between the cord and its connected part.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. In a combination with an elastic cord, a resilient ring fixed adjacent one end thereof, a fastening device including a sleeve member having a converging bore therein, spaced ribs extending from the walls of said bore, said elastic cord being pulled through said sleeve member to cause the resilient ring to be compressed by reason of engagement with the converging walls of said bore for locking engagement behind one of said ribs, and an eye swively connected to said sleeve member.

2. In combination with a cord, a resilient ring fixed adjacent one end thereof, a sleeve member having a converging bore therethrough, and ribs projecting from the walls of said bore, said cord adapted to be pulled through the bore of said sleeve member to cause the resilient ring to be compressed by reason of engagement with the converging walls of said bore for seating behind one of said ribs.

In testimony whereof we hereby affix our signatures.

JOHN MALCOLM THOMSON.
PETER HARDY.